(12) United States Patent
Hadidi et al.

(10) Patent No.: US 7,453,566 B2
(45) Date of Patent: Nov. 18, 2008

(54) HYBRID PLASMA ELEMENT MONITOR

(75) Inventors: Kamal Hadidi, Somerville, MA (US); Paul Woskov, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/513,798

(22) Filed: Aug. 31, 2006

(65) Prior Publication Data
US 2008/0055594 A1 Mar. 6, 2008

(51) Int. Cl.
*G01J 3/30* (2006.01)
*G01N 21/73* (2006.01)

(52) U.S. Cl. .................................... 356/316

(58) Field of Classification Search ................ 356/316, 356/311, 417; 250/288
See application file for complete search history.

(56) References Cited
U.S. PATENT DOCUMENTS 5,905,571 A * 5/1999 Butler et al. ................ 356/328
5,909,277 A * 6/1999 Woskov et al. .............. 356/316
6,429,935 B1 * 8/2002 Duan ......................... 356/316
6,594,010 B2 * 7/2003 Malczewski et al. ........ 356/311
2006/0119278 A1 * 6/2006 Kaneko et al. ......... 315/111.21

* cited by examiner

*Primary Examiner*—F. L. Evans
*Assistant Examiner*—Abdullahi Nur
(74) *Attorney, Agent, or Firm*—Sam Pasternack; Choate, Hall & Stewart, LLP

(57) ABSTRACT

Hybrid plasma monitor. A ground electrode is spaced apart from a high voltage electrode supporting an electric discharge therebetween to generate a plasma. The ground electrode and the high voltage electrode form an annular region into which a sample is introduced for generating a plasma. Microwave radiation couples into the plasma to sustain the plasma. A light detector such as a spectrometer receives light resulting from atomic emissions from the sample to analyze elements in the sample.

27 Claims, 2 Drawing Sheets

Figure 1. Block diagram of the hybrid plasma element monitor

HYBRID PLASMA ELEMENT MONITOR

BACKGROUND OF THE INVENTION

This invention relates to element monitors and more particularly to a hybrid plasma element monitor utilizing a high voltage electric discharge along with microwave radiation.

There is an increasing need for affordable, high sensitivity and easy to use methods to analyze water and gas samples for contaminants and other metallic content. Currently, water samples are analyzed for metallic content using a traditional inductively coupled plasma (ICP) in a laboratory. With this method, any sediment in the water is digested through acid additives and the solution is then injected into the ICP flame through a nebulizer. The nebulizer aerosolizes the solution into a fine mist. This aerosol is then heated to the vapor stage and subsequently cooled, allowing the water to be condensed out. What is left is the sediment content of the solution that is injected into the plasma for analysis. The limitations of this technique are that in addition to the cost of the ICP devices and ultrasonic nebulizers, this method generates a lot of hazardous waste and the required sample preparation is complicated and samples sizes are greatly restricted. The nebulizer transducer lifetime is limited and its efficiency diminishes with time making it essential to recalibrate the system often. Further, the method can only run in a laboratory environment with special gases such as argon. ICP is therefore unsuitable for field use.

Other methods have been developed for element monitoring but they have not been commercially used for matter analysis. These methods include a microwave generated plasma elements sensor developed at the Massachusetts Institute of Technology. See U.S. Pat. No. 5,909,277. Another similar technology that runs with argon gas was developed at the Los Alamos National Laboratory. See U.S. Pat. No. 6,429,935 The microwave plasma element sensors disclosed in U.S. Pat. No. 5,909,277 and No. 6,429,935 require costly, well regulated power supplies necessary to prevent the plasma from being extinguished by high sample throughput. These microwave plasma element sensors also require a minimum high power level above 500 Watts to sustain the plasma. In addition, these plasmas are difficult to start and therefore can not be pulsed easily to reduce average power requirements. A plasma atomic excitation technology that separates the plasma generation and excitation functions would improve the performance of these plasma element sensors and make possible reductions in required power levels with high sample throughputs.

SUMMARY OF THE INVENTION

In one aspect, the invention is a hybrid plasma element monitor including a ground electrode spaced apart from a high voltage electrode supporting an electric discharge therebetween to generate a plasma. The ground electrode and the high voltage electrode form an annular region into which a sample is introduced for exposure to the plasma. A source of microwave radiation is provided. The microwave radiation enters the annular discharge and downstream plasma regions. A light detector receives light resulting from atomic emissions to analyze elements in the sample. In a preferred embodiment the hybrid plasma element monitor includes a quartz lens for focusing the light on an optical system for conveying the light to the light detector. The optical system may be a fiber optics system. In a preferred embodiment, the light detector is a spectrometer or a photomultiplier.

In yet another embodiment, the hybrid plasma element monitor includes structure for introducing a swirl gas to prevent the electric discharge from attaching to a single point on the electrodes. A preferred source of the microwave radiation is a magnetron. In yet another embodiment, a computer is provided for analyzing signals from the light detector.

In another preferred embodiment, the electric discharge is between cylindrical electrodes or between parallel electrodes. It is preferred that a power supply be provided for the electric discharge having an output voltage in the range 0.5 kV and 20 kV. A suitable frequency of the output voltage is in the range of 1-200 kHz. A suitable current of the electric discharge is less than approximately 400 mA. It is preferred that the total power of the electric discharge is in the range of 50-1,000 watts. A suitable frequency of the microwave radiation is in the range of 800 MHz and 20 GHz. The power of the magnetron may be in the range of 1 watt to 2 kilowatts. The microwave radiation may be continuous wave (CW) or it may be pulsed. Further, the source of pulsed microwave radiation may have a high peak power in the range of 1 to 100 kW and an average power of 10 to 100 W.

In preferred embodiments the sample is gas, a liquid or a solid. In a preferred embodiment, the spectrometer uses a grating to decompose light and a charge coupled device (CCD) as a detector. Alternatively, the spectrometer uses a grating to decompose the light and a photomultiplier as a detector. The light detector may also be an array detector. In yet another embodiment, the element monitor of the invention further includes a lock-in amplifier to reduce background noise and increase sensitivity. It is preferred that the microwave radiation result in the plasma having an average temperature up to approximately 5,000° C.

The present invention thus overcomes the limitation of low sample throughput and high average power requirement of an atmospheric microwave plasma known in the prior art. The system disclosed herein takes advantage of a high voltage discharge that can breakdown any large sample flow stream including water and a microwave plasma that can sustain a 5,000° C. plasma and to excite any other matter entrained in the sample flow stream. In combination, this hybrid system allows very high sensitivity and accuracy in the detection and quantification of trace elements in water and gas streams.

An innovation of the present invention is the separation of the plasma breakdown and excitation functions. This results in a simple, low cost plasma sensor method that is a combination of a high voltage electric discharge with a readily available magnetron microwave source to process and excite the elements in a sample flowing through the plasma. The high voltage discharge generates the high electric field necessary to breakdown the sample flow and generates the plasma and the microwaves increase the average plasma thermal power and volume to sustain the plasma for excitation of the elements in large sample flows for detection.

Another innovation of this invention is the combination of a high voltage driven electric discharge with microwave radiation. The electric discharge contributes a high electric field to the microwave-created plasma, leading to a higher excitation probability of the elements to be analyzed in the plasma.

DESCRIPTION OF THE PREFERRED EMBODIMENTS

Figure 1:
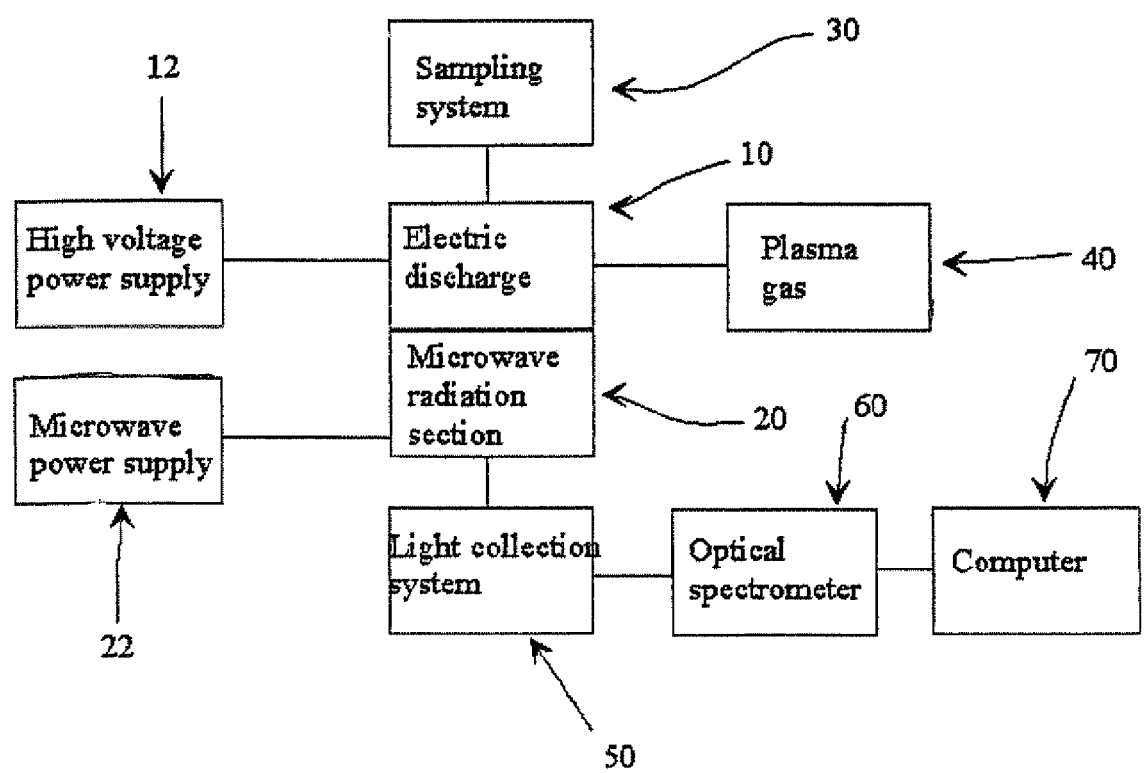
FIG. 1 is a block diagram detailing the innovation of combining two different plasma types into hybrid plasma for atomic emission spectroscopy.

A block diagram of the disclosed invention is given in FIG. 1. The hybrid plasma element monitor includes an electric discharge device 10 that is fed by a high voltage power supply 12, a microwave radiation section 20 that is fed by a microwave power supply 22, a sampling system 30 that feeds a sample into the plasma for analysis, a plasma gas feeder 40 that feeds plasma gas into the discharge device 10. The sample can be fed into the plasma at either ends of the plasma, i.e. through the electric discharge section 10, or through the microwave section 20. The plasma gas can be air, nitrogen, argon, or any other gas. The hybrid plasma element monitor also contains a light collection system 50 that can be a lens, a fiber optics, a mirror, or a combination of the three. The light collection system 50 feeds the light into an optical spectrometer 60 and a computer 70 acquires and analyzes the data.

Figure 2:
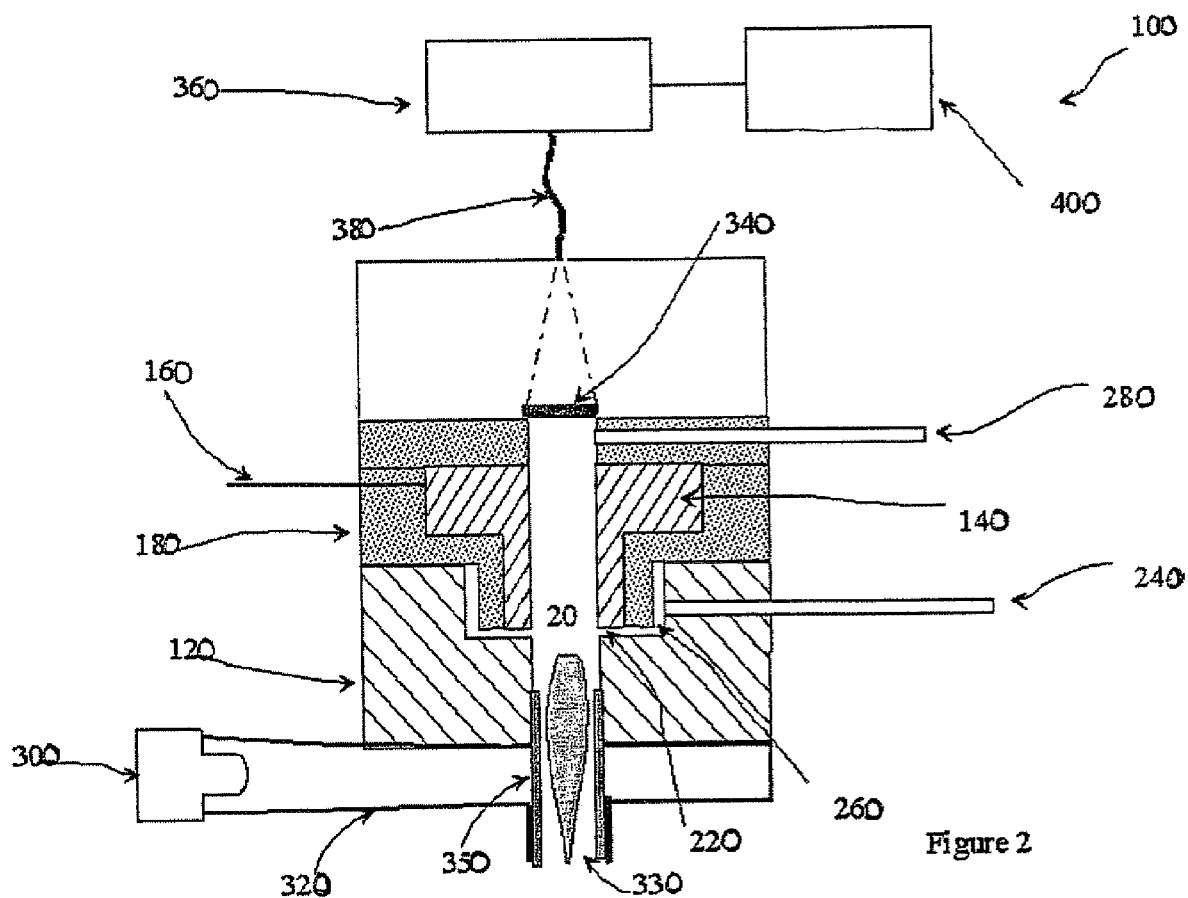
FIG. 2 is a cross-sectional view of an embodiment of the hybrid plasma element monitor disclosed herein.

In a preferred embodiment of the hybrid plasma elements monitor shown in FIG. 2, the hybrid plasma elements monitor 100 includes a ground electrode 120 and a high voltage electrode 140. A high voltage feed through 160 maintains the high voltage electrode at a high voltage with respect to the ground electrode 120 that is grounded. The ground electrode 120 and the high voltage electrode 140 are separated by an insulator 180.

Those schooled in the art will understand that an electric discharge will form in the annular region 200. The electric discharge is kept from attaching to a single point on the electrodes by swirl gas that flows between the two electrodes 120 and 140 at a relatively high velocity. This swirl is accomplished by small jets 220 that expel air or any other gas tangentially into the annular region 200 at high velocity. The annular region 200 created by the electrodes 120 and 140 forms a channel through which gas and sample to be analyzed flow. The swirl jets 220 are supplied from a swirl air input 240 leading to a swirl air chamber 260 and then through the jets 220. A sample is introduced into the monitor 10 through a sample input passage 280.

In this embodiment, the hybrid plasma element monitor 100 uses a high voltage alternating current (0.5-20 kV) power supply (not shown) with a frequency in the range of 1-200 kHz. It is preferred that the current be limited to less than 400 milliamps to minimize electrode wear. The total power of the electric discharge generated plasma should be between 50 and 1,000 watts.

A magnetron 300 is mounted on a metallic cavity 320 through which the plasma flows. Microwave radiation is beamed from the magnetron 300 into the plasma generated by the electric discharge in the plasma flow region 330 formed by dielectric sleeve 350. The microwave radiation is absorbed by the plasma generated by the electric discharge and makes the plasma volume larger and its average temperature higher (close to 5,000° C.). This high temperature allows the volatilization of any solid particle in the sample and the evaporation of liquid samples.

The atomic emissions from the plasma in the form of optical/UV light is transmitted through a quartz lens 340 to a light detector such as a spectrometer 360 through an optical fiber 380 (or any other optical systems). The spectrometer 360 decomposes the light spectrum and measures the intensity of the light at specific wavelengths to identify and quantify elements of interest in the sample. A computer 400 receives signals from the spectrometer 360, analyzes the signals and displays the results. In a preferred embodiment, the magnetron 300 is a CW magnetron in the power range of 1 watt to 2 kw. The CW magnetron may be powered by a power supply that is the same as ones used for household microwave ovens. Such a commercially available, off-the-shelf power supply component widely used in household microwave ovens makes the magnetron 300 very affordable. Alternatively, the magnetron 300 may be pulsed with a high peak power (50-5 kW) and a low average power (10-100 W).

In another embodiment, a lock-in amplifier (not shown) is used to reduce the background noise and increase the sensitivity of the elements monitor disclosed herein. In such an embodiment for water analysis, a peristaltic pump (not shown) can alternately inject water samples that need to be analyzed and water standards that don't have any metals in them. The monitor of the invention will take the difference in signal between the signal from the water samples and the signal from the water standards. In another situation suitable for water and gas monitoring, the lock-in amplifier is locked to the pulse rate of the microwave generator power supply and/or the frequency of the electric discharge power supply.

The hybrid plasma elements monitor disclosed herein can be used to monitor continuously for metals content and levels in ground and reservoir waters used as drinking water. In this case, a peristaltic pump would inject a known volume of water to be analyzed into the plasma. Another application of the technology disclosed herein is to monitor for metals level changes in bore holes along geological faults for the prediction of earthquakes as described by Claesson et al. in *Geology*, August 2004, pp. 644.

The hybrid plasma elements monitor disclosed herein can be used with solid samples. For example, the monitor can be used for the quantification of noble metals such as gold, platinum, and rhodium in ores in the mining industry. The use of the monitor disclosed herein will eliminate the need for more complicated methods such as fire assay used in the gold mining industry. In this case, solid samples from ore can be directly introduced into the plasma. Because of the high temperature of the plasma, all of the sample will be volatilized and chemical bonds will be destroyed transforming oxides and salts into their elemental elements thereby allowing the excitation of atomic lines and producing light emissions.

For gas monitoring, the hybrid plasma element monitor of the invention can be used to monitor hazardous metals such as mercury, arsenic and lead from thermal processes off gas such as coal-fired power plants and waste incinerators. In this case, the gas sample is continuously injected into the plasma in the cylindrical channel.

It is recognized that modifications and variations of the invention disclosed herein will be apparent to those of ordinary skill in the art. It is intended that all such modifications and variations be included within the scope of the appended claims.

What is claimed is:

1. Hybrid plasma element monitor comprising:
   a ground electrode spaced apart from a high-voltage electrode for maintaining an electric discharge therebetween to generate a plasma;
   the ground electrode and the high voltage electrode forming an annular region into which a sample is introduced for exposure to the plasma;
   a source of microwave radiation, the microwave radiation coupling into the plasma; and
   a light detector for receiving light resulting from atomic emissions to analyze elements in the sample.

2. The monitor of claim 1 further including a quartz lens for focusing the light on an optical system for conveying the light to the light detector.

3. The monitor of claim 2 wherein the optical system includes fiber optics.

4. The monitor of claim 1 wherein the light detector is a spectrometer.

5. The monitor of claim 1 wherein the light detector is a photomultiplier.

6. The monitor of claim 1 further including structure for introducing a swirl gas to prevent the electric discharge from attaching to a single point on the electrodes.

7. The monitor of claim 1 wherein the source of the microwave radiation is a magnetron.

8. The monitor of claim 1 further including a computer for analyzing signals from the light detector.

9. The monitor of claim 1 wherein the electrical discharge is between cylindrical electrodes.

10. The monitor of claim 1 wherein the electrical discharge is between parallel electrodes.

11. The monitor of claim 1 further including a power supply for the electric discharge having an output voltage in the range of 0.5 kV and 20 kV.

12. The monitor of claim 11 wherein frequency of the output voltage is in the range of 1-200 kHz.

13. The monitor of claim 1 wherein current of the electric discharge is less than approximately 400 mA.

14. The monitor of claim 1 wherein total power of the electrical discharge generated plasma is in the range of 50-1000 watts.

15. The monitor of claim 1 wherein the frequency of the microwave radiation is in the range of 800 MHz and 20 GHz.

16. The monitor of claim 7 wherein power of the magnetron is in the range of 1 watt to 2 kw.

17. The monitor of claim 1 wherein the source of the microwave radiation is a continuous wave source.

18. The monitor of claim 1 wherein the source of the microwave radiation is a pulsed source.

19. The monitor of claim 18 wherein the source of the microwave radiation is pulsed with a high peak power in the range of 50 to 5 kW and an average power of 10 to 100 W.

20. The monitor of claim 1 wherein the sample is a gas.

21. The monitor of claim 1 wherein the sample is a liquid.

22. The monitor of claim 1 wherein the sample is a solid.

23. The monitor of claim 4 wherein the spectrometer uses a grating to decompose light and a charge coupling device as a detector.

24. The monitor of claim 4 wherein the spectrometer uses a grating to decompose the light and a photomultiplier as a detector.

25. The monitor of claim 4 wherein the light detector is an array detector.

26. The monitor of claim 1 further including a lock-in amplifier to reduce background noise and increase sensitivity.

27. The monitor of claim 1 wherein the microwave radiation results in the plasma having an average temperature up to approximately 5,000° C.

* * * * *